R. S. SMITH, B. T. ANDREN AND H. MILLER.
DRAWING PRESS.
APPLICATION FILED FEB. 7, 1920.

1,373,572. Patented Apr. 5, 1921.
6 SHEETS—SHEET 4.

WITNESS

INVENTORS
R. Stanley Smith,
B. Torvald Andren and Henry Miller.
BY
ATTORNEYS

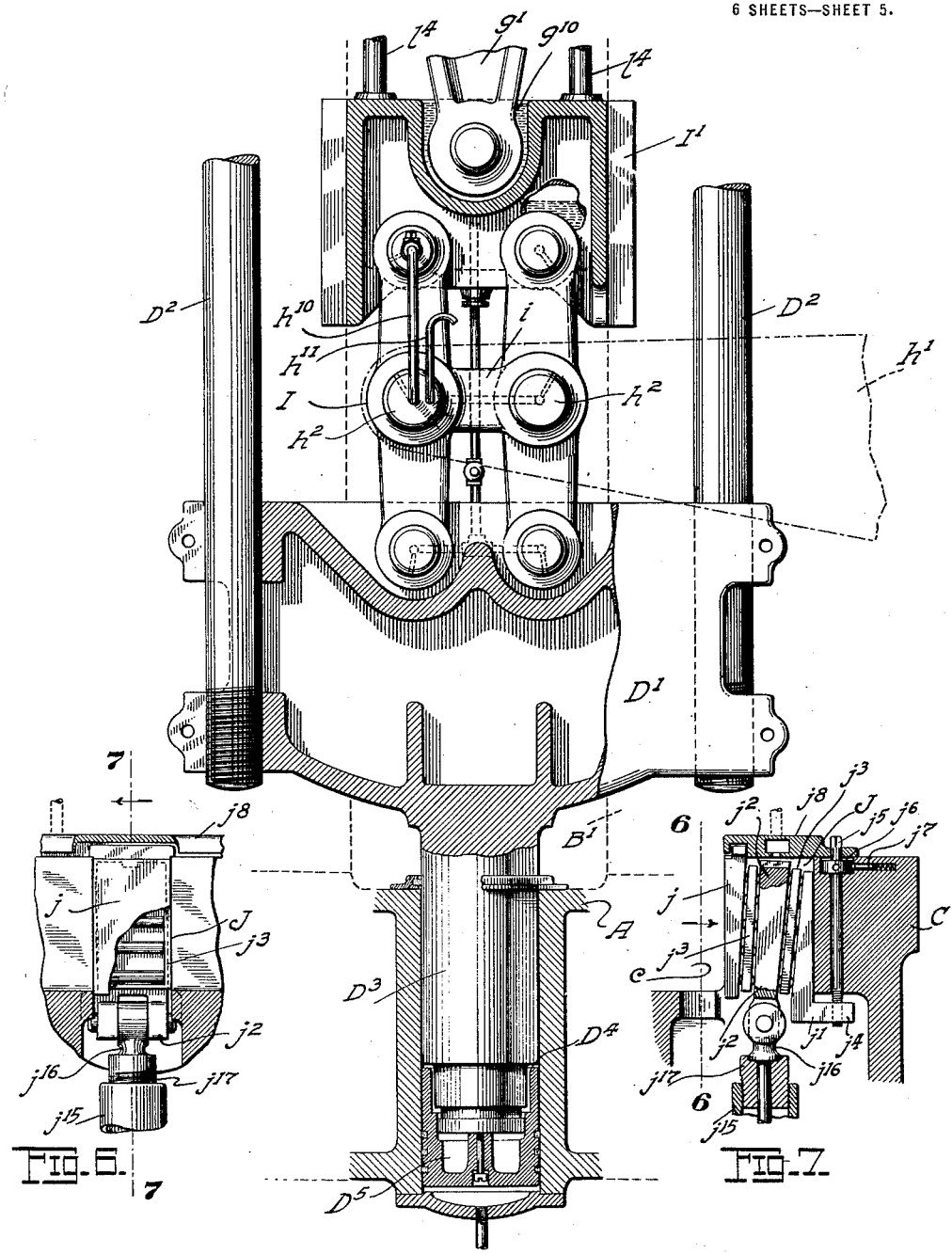

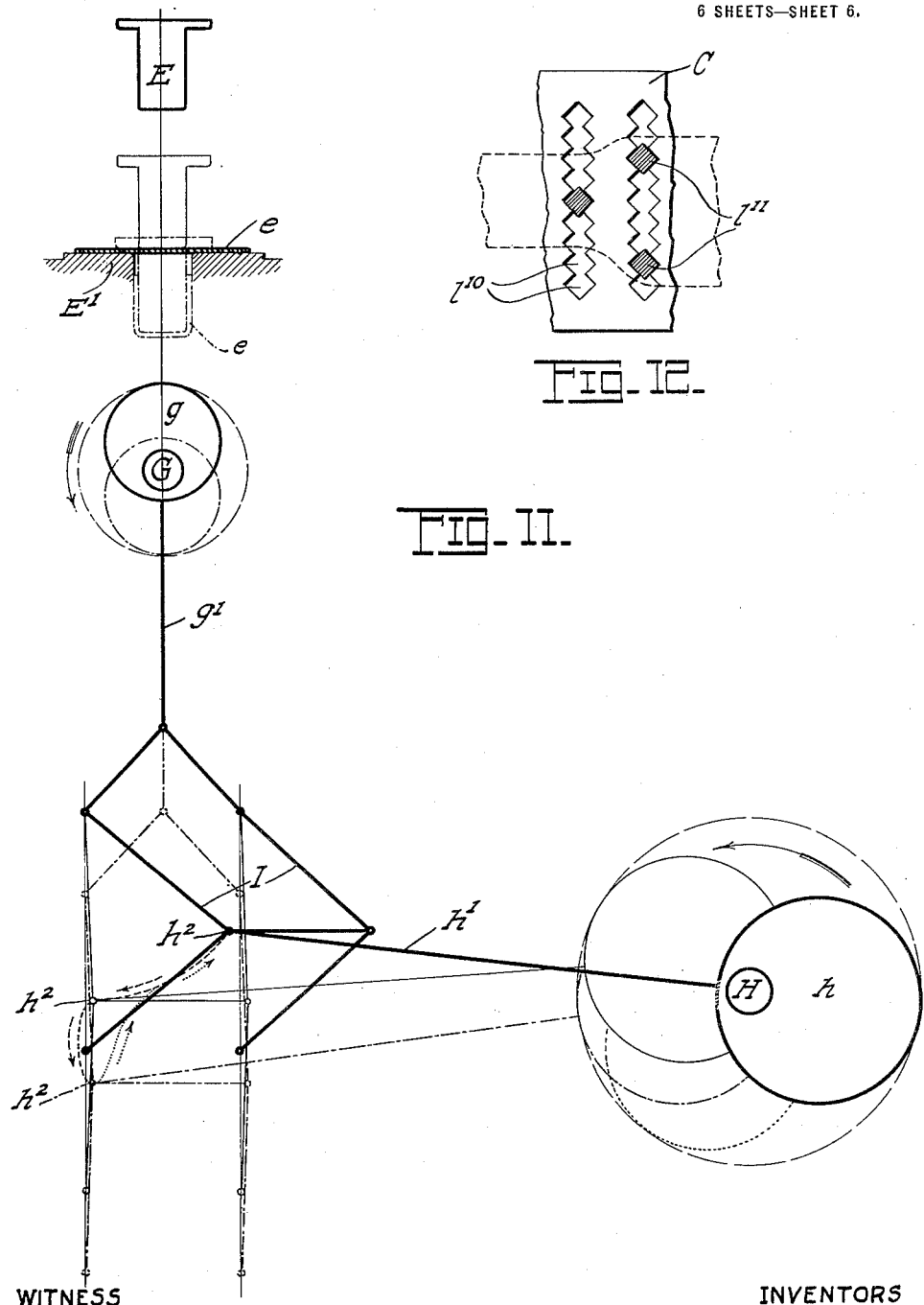

UNITED STATES PATENT OFFICE.

REUBEN STANLEY SMITH, BIRGER T. ANDREN, AND HENRY MILLER, OF MILWAUKEE, WISCONSIN; SAID ANDREN AND SAID MILLER ASSIGNORS OF THEIR WHOLE RIGHT TO A. O. SMITH CORPORATION, OF MILWAUKEE, WISCONSIN, A CORPORATION OF NEW YORK.

DRAWING-PRESS.

1,373,572.  Specification of Letters Patent.  Patented Apr. 5, 1921.

Application filed February 7, 1920. Serial No. 356,985.

*To all whom it may concern:*

Be it known that we, REUBEN STANLEY SMITH, a citizen of the United States, BIRGER TORVALD ANDREN, a subject of the King of Sweden, but who has declared his intention of becoming a citizen of the United States, and HENRY MILLER, a citizen of the United States, all residing in the city of Milwaukee, county of Milwaukee, and State of Wisconsin, have jointly invented a new and useful Improvement in Drawing-Presses, (Case #142;) and we hereby declare the following to be a full, clear, and exact description thereof, such as will enable persons skilled in the art to which the invention pertains to make and use the same, reference being had to the drawings annexed to this specification for a disclosure of one construction in which our invention has been embodied.

*The invention outlined.*

The invention relates to drawing presses which are designed to impart the desired shape to articles formed from sheet metal blanks of suitable contour.

The invention will be described as operating to convert such a blank into the side bar of an automobile or other vehicle frame, such side bar, as is well known in this art, having a vertical web and two parallel flange portions which are normal to the plane of the web.

The drawing press in which the present invention has been embodied is designed to form an element of the assemblage of machines disclosed in the application filed January 21, 1918, by R. Stanley Smith, one of the applicants herein, and bearing Serial No. 212,934. Such assemblage includes machines which by their related, connected and successive operations, punch from metal sheets the side and cross bar and other blanks used in constructing an automobile or other vehicle frame, draw such blanks into shape in accordance with the particular requirements appertaining thereto, perform the necessary milling operations thereon, assemble the constituent parts of the frame, and secure all of such parts in their respective positions, so that in a continuous operation of mechanical devices a completed automobile or other vehicle frame is automatically produced. The assemblage of machines referred to is operated in predetermined time-cycles, so that in such actuation, the automobile frames are manufactured wholly by mechanical means operating upon a schedule providing for the production of a given number of frames per minute.

The invention herein described and claimed, constitutes an improvement on the drawing press invented by the said R. Stanley Smith, and disclosed in Patent No. 1,338,355, granted April 27, 1920, upon an application Serial No. 180,758, filed July 16, 1917, to which patent reference may be had.

In our improved press, the shaft, gears, eccentrics and all of the actuating mechanisms are placed entirely below the line of the floor with reference to which the press is set, so as to afford free and unobstructed access to the bed of the press from all sides, without the interference heretofore encountered by reason of such actuating mechanisms being above the floor line and at the ends and rear of the press, as in the older forms. The location of all of such mechanisms below the floor line facilitates adjustment and lubrication of the parts, which operations may be performed from platforms built as a permanent part of the structure, and eliminates the necessity of mounting the superstructure of the press to perform such operations, as in the former types of presses, in which the operating mechanisms, or parts thereof, were arranged at an elevation above the floor; and, in some instances, considerably above the floor. By thus arranging the actuating mechanism, the only parts of the press which are visible are the bed and the upper part of the reciprocating punch carrying frame, together with the stripping devices, which latter are designed to strip the drawn article from the punch upon completion of the drawing operation, and which operate wholly within the planes of the vertically moving punch carrying frame.

Also, the arrangement of the matrix in a channel formed longitudinally in the bed of the press, enables us to produce a press having a smooth-top table, over which the work may be directed to the correct position between the dies, without having to lift such work by reason of the matrix standing above the face of the bed, as in the presses of the older forms.

We have preserved the general arrangement described in Patent No. 1,338,355, before referred to, in so far as the operative timing of the various movements are concerned, namely, the initial movement of the punch into position to clamp the blank to be drawn, such clamping movement in the present embodiment of the press being induced by a set of eccentrics moving through a fraction of a given time-cycle, followed by a second movement of the punch through a second fraction of the time-cycle to perform the drawing operation and withdraw the punch from the matrix, such second movement of the punch being induced by another set of independently operating eccentrics, with the restoration of the punch to its initial position during the third fraction of the time-cycle, such final movement being induced by the first mentioned set of eccentrics. The action of the said first mentioned set of eccentrics during the second fraction of the time-cycle is very slight, but such action is co-incident with and is absorbed in the greatly reduced movement of the punch to perform the drawing operation and withdraw from the matrix during the same fraction of the time-cycle.

As a result of this construction, the punch has a relatively fast movement to the position in which it acts to clamp the blank upon the matrix, followed by a slower movement to perform the drawing operation and withdrawal of the punch from the matrix, and lastly, a correspondingly fast movement of the punch to its initial raised position.

The eccentrics which impart the initial movement of the punch to its clamping position and which restore the punch upon completion of the drawing operation, are mounted upon a constantly driven shaft. The eccentrics which impart the drawing movement to the punch and which withdraw the latter from the matrix upon completion of the drawing operation, are mounted upon a shaft which is driven intermittingly, and which is operated, as hereinbefore stated, in a fraction of the time-cycle in which the first named eccentric shaft makes its movement of complete rotation. The two eccentric shafts are driven from a common power shaft, from which leads two trains of reducing gears, one to each of the eccentric shafts. The second eccentric shaft, or that one which actuates the punch to perform the drawing operation, is thrown into and out of operative relation by means of a clutch, which latter is shifted so as to make and break the connection between the said second eccentric shaft and the main driving shaft at the desired intervals of time, with the result that both eccentric shafts are rotated in the order previously described.

The initial movement of the punch into position to clamp the contoured blank which has previously been placed in predetermined position upon the face of the matrix, preparatory to the drawing operation, acts as a clamp to hold the blank firmly against the upper face of the knock-out plate. The knock-out plate is rigidly sustained at the moment, so that when the blank is pressed against the face thereof by the clamping action of the punch, such blank is held between the two members as in a vise. The knock-out plate has a movement of recession which is co-incident with the advancing movement of the punch to perform the drawing operation, but during such movement, as well as during the withdrawal movement of the punch, the clamping relation between the punch and the knock-out plate is maintained, inasmuch as the actuating mechanism for these parts is so proportioned that such parts move as one during the fraction of the time-cycle prescribed for their operation in drawing the blank into the shape desired.

The punch in withdrawing from the matrix is followed by the upward movement of the knock-out plate, with the result that the article which has been shaped from the blank, is ejected from the matrix. At the moment that the knock-out plate reaches the level of the face of the matrix, the stripper devices, acting in conjunction with the punch as the latter rises to its initial position, operate to strip the shaped article from the punch, leaving such article free to be withdrawn from the press.

Inequalities and irregularities when present in the metal constituting the blanks, impose severe strains upon the operating mechanisms of the press when equipped with a fixed matrix, at the time when the punch forces the blank into the matrix. These strains have a destructive tendency, which we eliminate by the provision of laterally movable side members for the matrix, which latter parts are so arranged with relation to the punch as to allow sufficient clearance for the punch to carry the blank into the matrix, without encountering the wedging action which is experienced in the older forms of presses. These movable side members of the matrix are normally held in a retracted position in the channel formed in the bed of the press. Means have been devised for effecting the lateral movements of the matrix members to force the blank against the sides of the punch, while the latter is in the matrix, and thus impart the perfected contour to the article which has been drawn between the punch and the matrix. The devices for imparting the lateral movements to the side members of the matrix are actuated to give a quick movement of the said members against the blank and set the latter in the exact form desired. These actuating devices are operated at the correct time by cams mounted upon the shaft carrying the eccentrics which impart the drawing movement to the punch, at the moment that the latter reaches its bottom stroke.

In the older forms of presses, the knock-out plate, which, as has been explained, is a device moving vertically in the matrix to insure the ejection from the matrix of the plate drawn into shape by the action of the dies of the press, and forming also one member of the clamping devices, has been operated in its ejecting movement by a series of vertically moving knock-out rods, which latter have a sliding movement in circular openings in the bed of the press. These openings in the bed of the press are distributed with regularity, but do not always have a correct register in relation to the outlines of the matrix when the latter is placed upon the press. As a result, it is not always possible to position the vertical rods in their relation to the knock-out plate, to secure the necessary support for the latter, as effectively as may be desired. But we have devised an arrangement whereby such rods may be selectively positioned, so that the pressure exerted by them is more evenly distributed at the under side of the knock-out plate, with the result that a more satisfactory operation of the clamping mechanism is attained.

We achieve this result by providing a succession of parallel cross slots or vertical openings in the bed of the press, instead of the customary circular openings, such cross slots being formed in the bed from one end thereof to the other, and embracing that portion which is contiguous to or underlies the channel formed in the bed for the reception of the matrix members. In each of these slots we propose to place a plurality of fillers, so disposed as to completely fill the slot, and yet have capacity for free vertical sliding movement therein. Certain of these fillers are of superior length, and these latter are so positioned that they will stand normally with their projecting ends well distributed throughout the area of the matrix. The selected fillers act as distance pieces to resist the thrust of the punch in the clamping movement, also as knock-out rods, when moved by the lifter plate upon which they rest at their lower ends, and when so moved, operate the knock-out plate resting upon their upper ends, for the purpose previously described. It will be understood that the fillers referred to are formed as units, and that they may be selectively interchanged and arranged to conform to the outlines of the matrix when the latter is placed in the press.

The number of knock-out rods of superior length which are employed for this purpose, and their disposition in the slots in the bed, will be such that the blank is effectively clamped between the punch and the knock-out plate with a substantially uniform pressure during the whole of the drawing operation.

The movable punch carrying frame is supported and guided at its lower end by means of plungers working in cylinders formed in the base of the press. Fluid pressure exerted in the cylinders serves to counterbalance the punch carrying frame during the movements of the latter.

The toggle mechanism which we employ for effecting the clamping action hereinbefore described, and through which toggle mechanism the thrust of the punch in performing the drawing operation is transmitted, is equipped with a system which insures efficient lubrication at all times. The lubricating system is provided with a visual indicator, the casual observance of which will indicate the time for replenishment of the reserve supply of lubricant, whenever the latter may be necessary.

In our improved press, we have arranged the shaft which operates the drawing mechanism in journal boxes which underlie the bed of the press, so that the thrust of the eccentrics on the said shaft and the resistance of the punch in performing the drawing operation are transmitted in a direct line through the bed. By this arrangement, the strains incident to the operation of the press are equalized and a more efficient operation secured.

The claims appended to this specification will define our invention, but although we have referred to our improved press as designed to form an element of the assemblage described in application Serial No. 212,934, it will be understood that the press is not limited to use in such relation, but that it may be used as a drawing press independently of association with any other mechanisms.

In the accompanying drawings,

Fig. 5 is an enlarged view of certain of the parts shown in Fig. 1, some of such parts being shown in section for the sake of clearness, this view being in continuation of and to about the scale of the parts shown in Fig. 4.

Fig. 6 is a detail view on the line 6—6 of Fig. 7, and

Fig. 7 is a like view on the line 7—7 of Fig. 6, showing the devices which impart a lateral movement to the side walls of the matrix of the press, the view being similar to Fig. 4, but being enlarged.

Fig. 8 is a plan view showing the manner of mounting the cam and the rock shafts which actuate the stripper mechanism.

Fig. 9 is a detail view showing the stripper arm with a stripper finger adjustably mounted therein, and Fig. 10 is a view on sectional line 10—10, Fig. 9, showing the manner in which the stripper finger is held in its adjustable position in the stripper arm.

Fig. 11 is a diagrammatic view illustrating the movement of the punch, first, to clamping position, and second, to drawing position, with the relative positions of the actuating means which induce such movements.

Fig. 12 is fragmentary plan view of the bed of the press, showing a modification in the form of the slot under the matrix and in the means for supporting the knock-out pins in selective arrangement.

Like reference characters are employed to identify the same parts in the several views.

Figure 1:
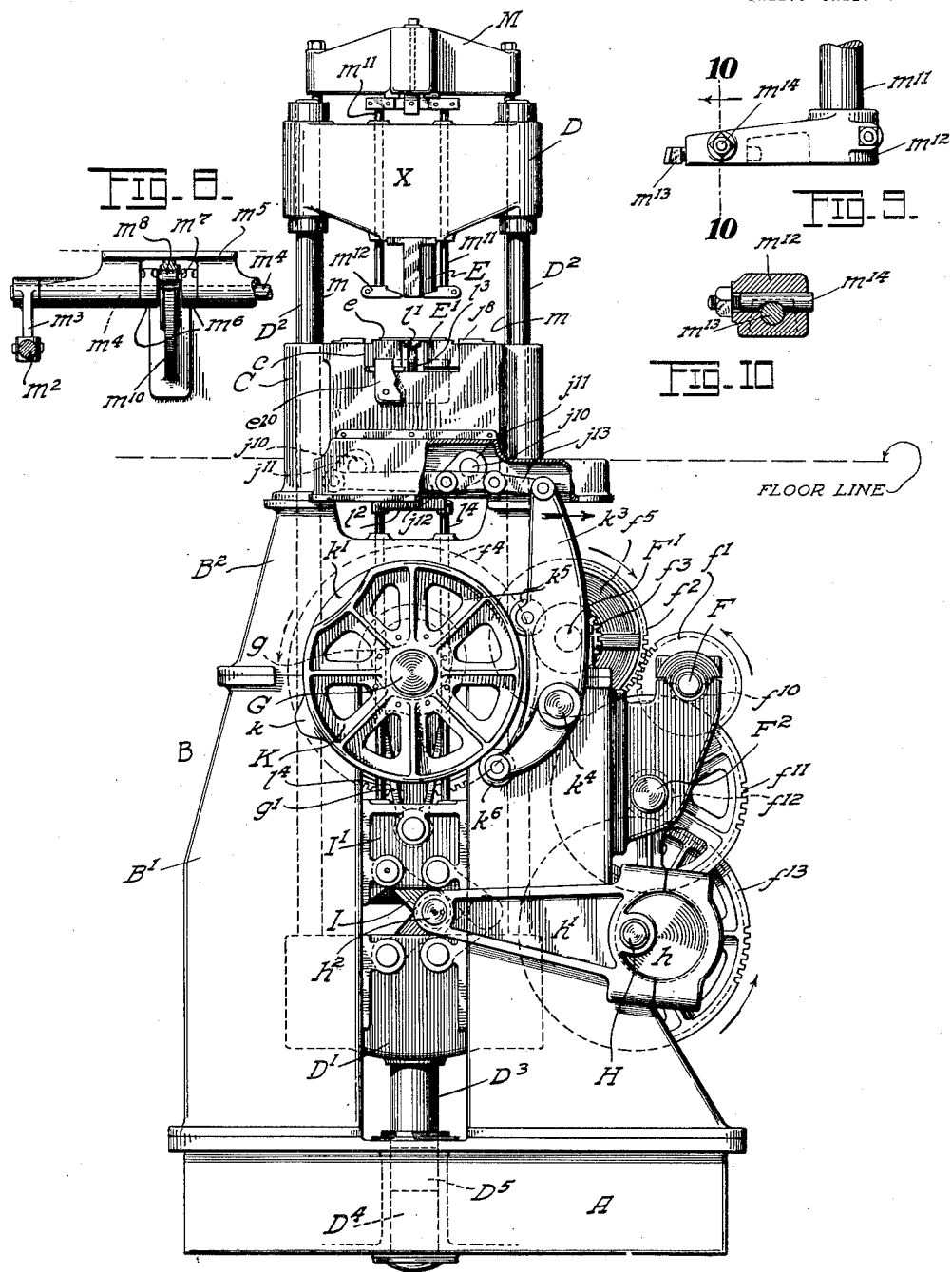
Figure 1 is a right hand end elevation of my improved press, showing the principal operating mechanisms, some of the parts being indicated by dotted lines.
Figure 2:
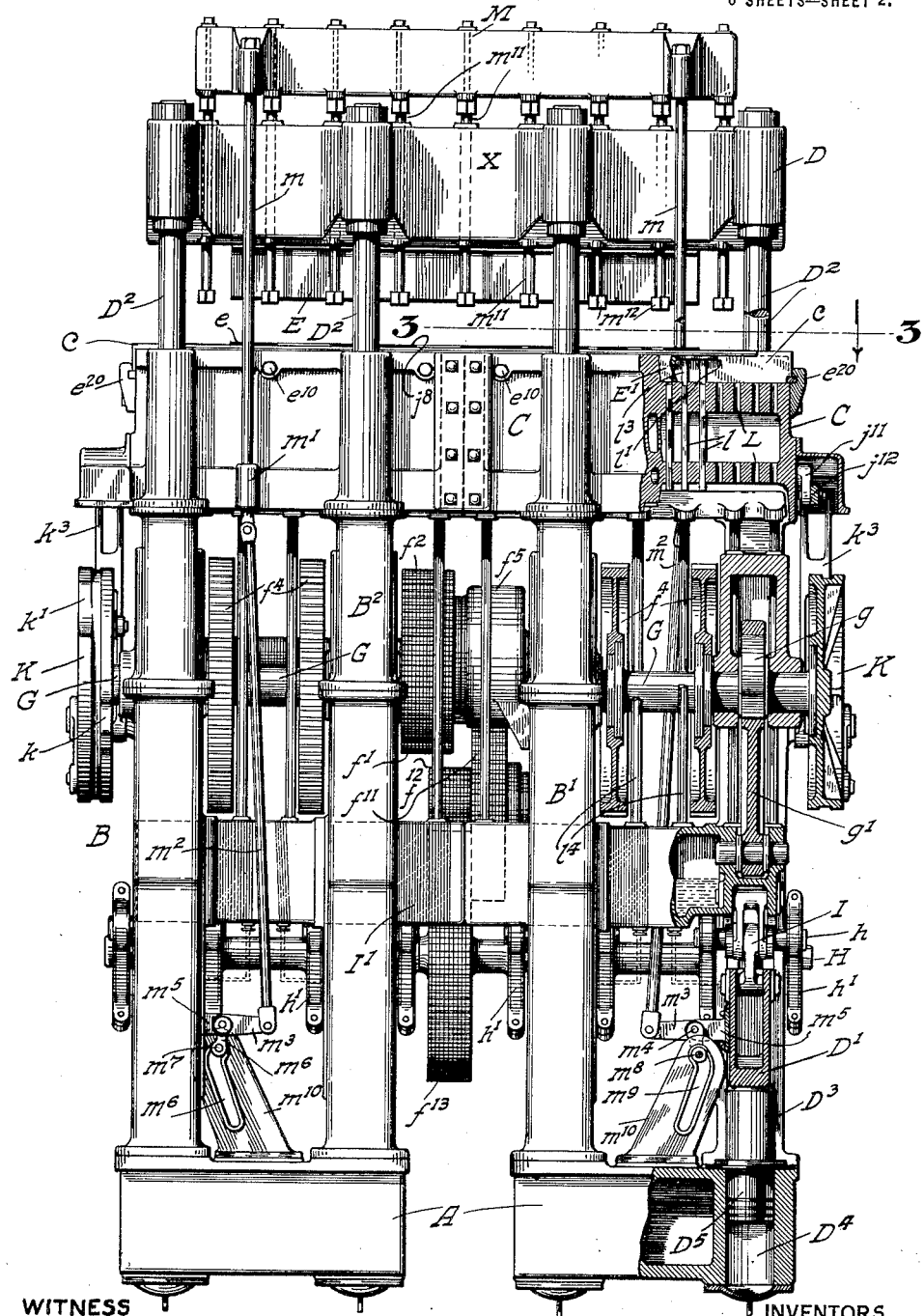
Fig. 2 is a front view of the press, parts being broken out in order to show more clearly certain features of construction.
Figure 3:
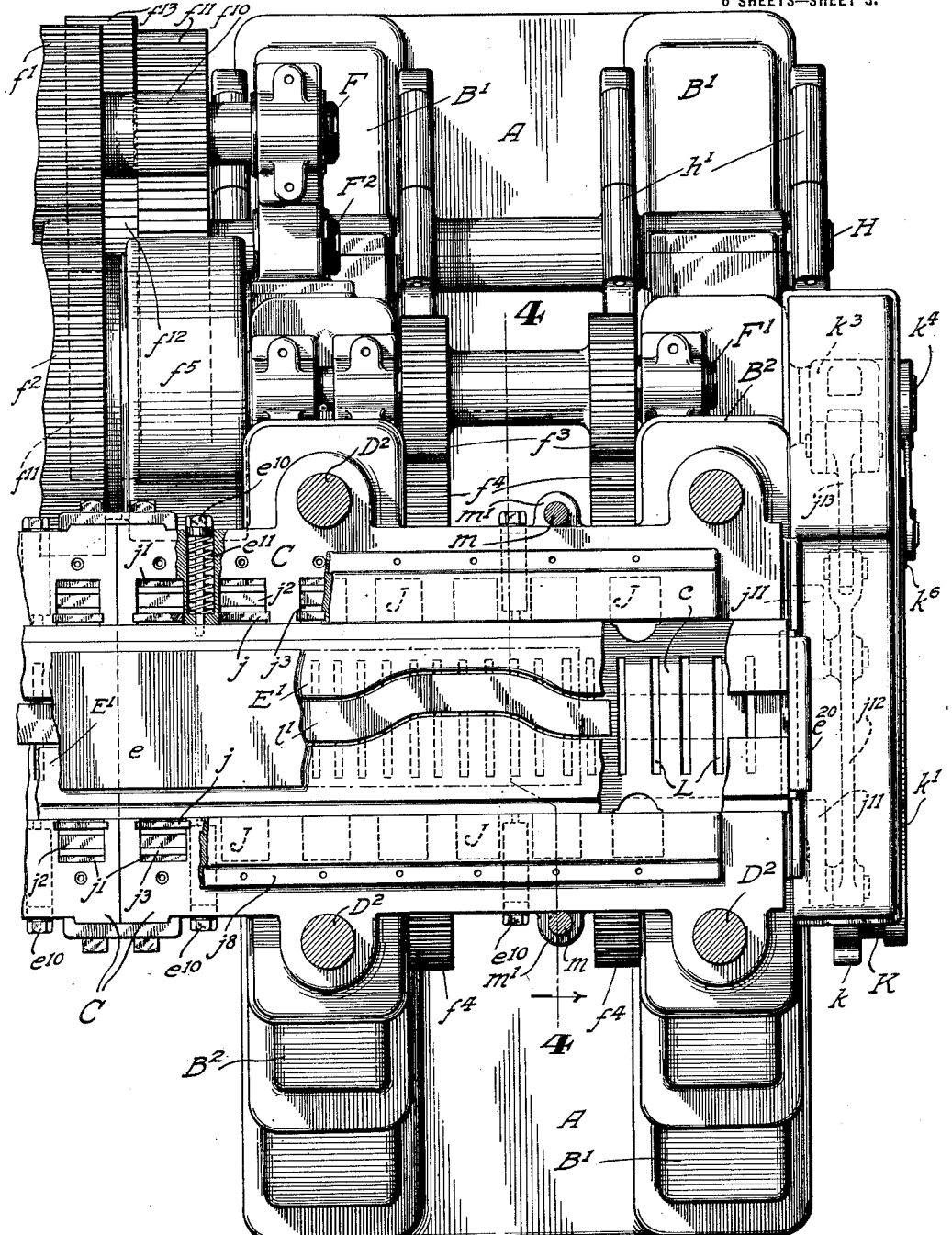
Fig. 3 is an enlarged plan view on the line 3—3, Fig. 2, the view being broken out in places to better show certain of the structural arrangements.

The press in general.

In a drawing press now being erected, and in which the present invention is embodied, the operating mechanisms for the several elements of the press are placed wholly below the floor line with reference to which the press is to be set, and only the upper part thereof, excluding all of the operating shafts and gears, is visible. This arrangement provides a clear and open space all about and around the press, so that the freest access thereto may be had from all sides, without obstruction by the driving mechanisms employed heretofore in drawing presses of the present type. The total height of the press is approximately 32 feet.

The base A of the press rests upon concrete or other footings at the bottom of a pit of suitable dimensions. The main frame B, comprising two sections, $B^1$ and $B^2$, one mounted upon the other, rests upon the said base. The upper level of the main frame B extends to a point just below the floor line, and the bed C of the press is mounted upon the said main frame. In practice the base A, the frame sections $B^1$ and $B^2$, and the bed C will be suitably connected to form a unitary and rigid structure.

The upper face of the bed C is provided with a longitudinal channel $c$, in which is placed the matrix $E^1$, of the press, constructed and operating in a manner which will hereinafter be described. The upper crosshead D and the lower crosshead $D^1$ are connected by a series of vertical tie or straining rods $D^2$, to form a structure which moves as a unit. The rods $D^2$ slide in vertical bearings formed in the sides of the bed C. The movable structural unit composed of the crossheads D and $D^1$, and the straining rods $D^2$, will be referred to as the movable punch frame, and for convenient reference, is indicated X. The punch E, mounted at the under side of the upper crosshead of the punch frame X, coöperates with the matrix $E^1$ in the bed C, to impart shape to the articles which are drawn by the press.

The heavy shaft upon which are mounted the eccentrics for actuating the punch E in performing the drawing operation, is journaled in bearings which underlie the bed of the press. By this arrangement, we provide a construction in which the thrust of the eccentrics and the resistance of the punch, while the blank is being drawn, are transmitted in a line directly through the bed of the press, and thus we distribute more evenly the strains which are inherent in drawing presses of the present type. We find also that the arrangement referred to eliminates or reduces in a considerable degree the elasticity which exists in similar presses which are required to exert an enormous pressure in performing their work.

The movements of the punch.

As a preliminary to a detailed explanation of the construction and operation of our new and improved drawing press, we will first refer to Fig. 11 of the drawings. The said figure illustrates diagrammatically the several movements of the punch E in the operation of the press. In this view the heavy lines indicate the initial or normal position of the punch E and its two actuating mechanisms, which latter will presently be described in detail. The light lines show the punch when moved to position to clamp the plate upon the matrix, and also the eccentrics on the clamping shaft H and the toggle members in the positions occupied by them at the completion of such clamping movement. The broken lines indicate the position of the punch after having performed the drawing operation, and also indicate the relative positions of the second set of eccentrics after the drawing shaft G has made one half of a revolution. The irregular dotted line indicates the path of movement of the central pivotal point $h^2$ of the toggle mechanism during the clamping and drawing operations, the course of such movement being indicated by arrows in the said Fig. 11. The larger circles concentric with the shafts indicate in broken lines the paths of the eccentrics.

The driving mechanism.

The power shaft F is constantly driven, and through a train of reduction gears $f^1$, $f^2$, $f^3$, and $f^4$, and intermediate shaft $F^1$, upon which the gear $f^2$ and $f^3$ are mounted, imparts a movement of rotation to the crank or eccentric shaft G, journaled in the main frame. The gear $f^2$ is loose upon the shaft $F^1$, but is adapted to be coupled thereto by means of a clutch mechanism $f^5$, whereby the crank shaft G may be driven intermittingly, as and for purposes which will be hereinafter described. The power shaft also, through a train of reduction gears $f^{10}$, $f^{11}$, $f^{12}$ and $f^{13}$, and intermediate shaft $F^2$, upon which the gears $f^{11}$ and $f^{12}$, are mounted, drives a constantly rotating second crank or eccentric shaft H, likewise journaled in the main frame.

The clamping mechanism.

The crank or clamping shaft H imparts an initial or clamping movement to the punch E, by means of a series of eccentrics $h$, mounted upon the said shaft, which eccentrics actuate eccentric links $h^1$, the latter being pivotally connected at their other ends to a toggle mechanism I, working between the lower crosshead $D^1$, and sliding blocks $I^1$, guided in the main frame. The purpose of this initial movement of the punch E, is to bring the said punch into clamping relation with reference to the metal blank to be drawn, and which has been positioned and is resting at this time upon the matrix $E^1$ in the bed of the press. The action of the eccentrics $h$, upon the toggle mechanism is transmitted to the lower crosshead $D^1$ and through the straining rods $D^2$, to the upper crosshead D. The throw of the eccentrics $h$ needs merely to be sufficient to move the punch to effect such clamping relation. The toggle mechanism I, referred to, is of the double type in the present embodiment of the invention, the central pivotal points $h^2$, $h^{20}$, of the respective pairs of the toggle members, being connected by a link $i$, so that the elements of the toggle will operate in unison, and with a more even distribution of the pressure exerted. The connection of the links $h^1$, with such toggle mechanism is made at the central pivotal point $h^2$, of one pair of each set of toggle members.

The drawing mechanism.

The crank or drawing shaft G carries a series of eccentrics $g$, which actuate eccentric links $g^1$, which latter at their other ends are pivoted to the sliding blocks $I^1$. It will thus be seen that the point $h^2$, constituting the point of pivotal connection between the link $h$ and the toggle mechanism, has a floating movement through a curved path during the time that the eccentrics $h$ are acting to bring the punch E carried by the crosshead D into clamping engagement with the blank $e$ resting upon the matrix of the press, and during the subsequent movement of the die to perform the drawing operation. See Fig. 11. The press will be described as acting to draw a properly contoured blank or plate $e$, into a channel bar having two opposite horizontal flanges and a connecting, vertical, reinforcing web, the channel bar thus formed being designed to constitute one of the side bars of an automobile frame.

The clamping and drawing operations.

When the comparatively fast movement of the punch E to the position in which it acts to clamp the blank $e$, and hold it against displacement, as previously described, has ended, the drawing operation performed by the further movement of the punch E into the matrix $E^1$ is commenced. This drawing movement is effected by the action of the eccentrics $g$, mounted upon the drawing shaft G, which eccentrics impart a downward movement to the sliding blocks $I^1$, such movement being transmitted through the now straightened toggle members I, to the lower crosshead $D^1$. The movable punch frame X is thus operated to force the punch E and the blank $e$ into the matrix $E^1$, the said blank $e$ being drawn into the desired shape during such operation.

In the press under construction, the gears hereinbefore described have been so proportioned that the shafts G and H operate at the definite speed-ratio of 3 to 1 respectively, and likewise such shafts rotate in a predetermined time-cycle. The eccentric shaft H makes six revolutions per minute, one revolution of the said eccentric shaft H being the unit which is used as the basis for computing the time-cycle. Within the cycle of 10 seconds allowed for one revolution of the shaft H, the shaft G makes one revolution to operate the drawing mechanism actuated therefrom to perform the drawing operation upon the blank $e$. But while the rotation of the eccentric shaft H is constant, the rotation of the drawing shaft G to perform the drawing operation is intermitting, and such rotation of the shaft G is effected during one-third of the time-cycle required for the rotation of the said shaft H. In the manner hereinbefore described, the eccentric shaft H moves the punch E to clamp the blank e between the said punch and the knock-out plate and upon the matrix, during the first one-third of the cycle of 10 seconds allowed for the operation of the press. By reason of the toggle connection, and the arrangement of the eccentrics h, this movement to clamp the blank is comparatively fast, but upon the completion of such clamping movement, the drawing shaft G is thrown into operation through the clutch mechanism, before referred to, and the said shaft G has imparted thereto a movement of complete rotation during the second one-third of the time-cycle, to actuate the eccentrics g to force the punch and the blank e into the matrix, and thus give the desired shape to the article formed from the blank. While the shaft G is driven at a uniform speed of rotation, the arrangement of the eccentrics g mounted upon the said shaft is such that a comparatively slow movement is imparted to the punch at the commencement of the drawing operation. But such movement is accelerated as the eccentrics approach the point of their extreme throw in the same direction, to complete the drawing operation, such movement merging into a momentary dwell as the eccentrics g pass their dead centers, and retraction of the punch is commenced. The punch is withdrawn to an elevation which is just clear of the face of the matrix as the eccentrics g reach the limit of their reverse throw. At this moment the clutch mechanism $f^5$ is operated to disconnect the drawing shaft G from its driving connections, and the said shaft G and the eccentrics carried thereby are brought to their initial position of rest. During the remaining one-third of the time-cycle the eccentrics h pull upon the toggle connection, which is now broken, and raise the movable punch frame X to its highest position. The clutch $f^5$ is operated by a timing mechanism, which latter serves to connect and disconnect the clutch at the required moments in the time-cycle, to effect the actuation of the punch to perform the drawing operation.

*Counterbalance for the punch frame.*

The crossheads $D^1$ are provided with depending plungers $D^3$, which work in cylinders $D^4$, formed in the base A of the press. The plungers $D^3$ are provided with pistons $D^5$, and the cylinders are designed to contain any suitable fluid under pressure. This construction enables us to achieve some very desirable results, in that the plungers, which work in the cylinders, constitute a means for guiding the movable punch frame X at its lower end, and constituting also a means whereby a perfect counterbalance for the movable punch frame is provided through the medium of the resistance of the fluid in the cylinders. When oil is used as a medium of resistance, an efficient means of lubrication for the plungers $D^3$ is provided.

*The matrix with movable members.*

The parts or members constituting the matrix $E^1$, are placed in the longitudinal channel c in the bed C, as previously described. These parts of the matrix are arranged so as to have a slight movement toward each other, so as to apply a side pressure to the blank at the moment that the die E has completed its drawing operation, the purpose of such movement of the matrix members being to impart a perfect shape to the article which has been drawn. The provision of a matrix with movable side members permits the operation of the press with greater facility and with a great economy of power. In presses of the ordinary type, the fixed matrix is set with reference to its operation upon plates of predetermined gage, but it sometimes happens that inequalities in the stock impose very severe strains upon the press when the punch is operated to force the blank into the matrix to draw the blank into shape. The provision of a matrix with movable side members enables us to overcome the difficulties referred to, and such inequalities as may exist in the stock being fed to the press, will not subject the press to the strains incident to the former conditions, inasmuch as the slight clearance provided permits easy movement of the punch to draw the blank, without wedging in the matrix.

*The wedging devices.*

Figure 4:
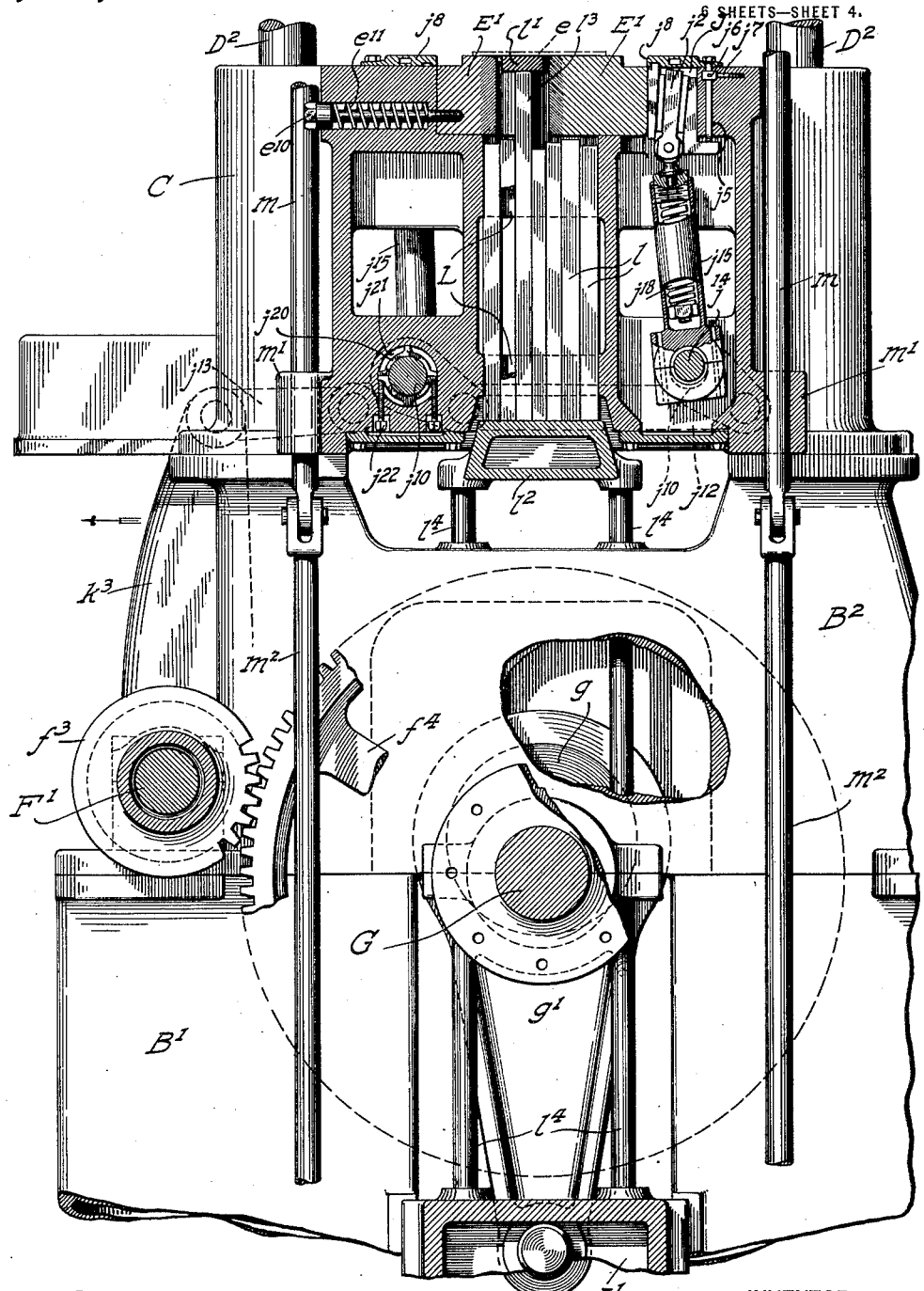
Fig. 4 is a sectional view on the line 4—4, Fig. 3, and drawn to the same scale.

Figs. 4, 6 and 7 show details of the devices which we employ for giving the side members of the matrix the lateral movements referred to, to force the drawn article into the exact shape desired. At intervals, the bed is provided with vertical openings J, in which we install a wedge mechanism, the purpose of which is to crowd the movable side members of the matrix into engagement with the work which has been drawn, at the moment of the completion of the latter. Plates j and $j^1$, arranged in the opening J, receive between them a wedging member $j^2$. The plates j are adapted to bear against the outer sides of the movable matrix parts, and the plates $j^1$ are adapted to rest against the opposite side of the openings in the bed, the wedge $j^2$ working between the plates j and $j^1$. Antifriction rollers $j^3$ are interposed between the sides of the wedge $j^2$ and the plates j and $j^1$ respectively, so that in the movement of the wedge $j^2$ the pressure thereof is transmitted through the antifriction rollers to the plates $j$ and $j^1$. The plates $j$ and $j^1$ are provided with inclined faces which are parallel to the faces of the wedge $j^2$. The plate $j^1$ is connected to the bed C by means which will admit of vertical adjustment so that the extent of the pressure exerted by the wedge $j^2$, when the latter is moved may be regulated. As shown in Fig. 7 the said plate $j^1$ is provided with a toe $j^4$, which is threaded for the reception of an adjusting screw $j^5$, the said screw being guided in a vertical opening in the bed C. A collar $j^6$, affixed to the upper end of the said screw is seated in an enlarged recess in the bed. Upon its circumference, the said collar is provided with a series of depressions, which receive the end of a spring pressed locking detent $j^7$, seated in the bed C, which detent serves to prevent the accidental rotation of the screw, and to hold the latter in its adjusted position. By the means described, the plate $j^1$ may be raised or lowered to vary the width of the opening between plates $j$ and $j^1$. The plate $j$ is guided loosely in the opening J in the bed, so as to follow the inward movement of the matrix member, when the wedge $j^2$ is actuated. A cap rail $j^8$, attached to and extending the length of the bed, covers the wedging devices described.

*Mechanism for moving the matrix members.*

In Fig. 1 we have shown the mechanism which is employed to actuate the wedges at the desired moment to move the matrix members toward each other, to impart the final set to the article which has been drawn. Mounted upon each end of the drawing shaft G is a cam K of peculiar construction. This cam is provided with a high point $k$ and a low point $k^1$, which stand in different vertical planes, such points being designed to act upon different elements during each rotation of the cam. An oscillating lever $k^3$ is journaled upon a stud $k^4$ fixed in the frame B of the press in juxtaposition to the cam wheel K. On its front face and at points on opposite sides of the stud $k^4$, the said lever is provided with antifriction rollers $k^5$ and $k^6$. These antifriction rollers $k^5$ and $k^6$ stand in the planes of the cam points $k$ and $k^1$, respectively. In the rotation of the cam K, the high point $k$ contacts with the antifriction roller $k^5$ at the instant that the low point $k^1$ of the cam is brought into engagement with the antifriction roller $k^6$. The effect of these movements is to impart a rocking movement to the lever $k^3$ upon the pivotal stud $k^4$, the direction of such rocking movement being indicated by the arrow adjacent the upper end of the lever $k^3$, in Figs. 1 and 4. From the construction illustrated in Fig. 1, it will be seen that the antifriction rollers $k^5$ and $k^6$ are at all times in engagement with the periphery of the cam wheel K, and that the lever $k^3$ maintains the position shown in Fig. 1, except for the brief moment of its oscillation due to the passage of the cam points over the antifriction rollers thereon.

The oscillating movements of the lever $k^3$ are transmitted to the wedges $j^2$, by the mechanism which will now be described. Rock shafts $j^{10}$ extending longitudinally of the bed of the press, are provided with radial arms $j^{11}$. These radial arms are connected at their outer ends by a bar $j^{12}$, which latter is connected to the upper end of the oscillating lever $k^3$ by means of a link $j^{13}$, as shown in Fig. 1. The shafts $j^{10}$ are provided at certain points in their length with eccentric portions $j^{14}$. Eccentric links $j^{15}$, the straps of which embrace the eccentrics $j^{14}$, are connected to the lower ends of the wedges $j^2$, whereby said wedges are actuated by the cam K in the manner described, to move the side members of the matrix. In the construction illustrated, the eccentric link $j^{15}$ is shown as a tubular member, within which is arranged a bolt $j^{16}$, having an eye which is pivotally connected to the lower end of the wedge $j^2$. The said bolt is guided in the bore of a nipple $j^{17}$ threaded into the open end of the tubular member $j^{15}$. Confined about the bolt $j^{16}$, and within the tubular member $j^{15}$, is an expansion spring $j^{18}$, which latter is set at an initial tension, so that the parts of the eccentric link $j^{15}$, will work as one under ordinary conditions. However, if the punch E of the press, in forcing the blank into the matrix, creates such an obstruction as will prevent the side members $E^1$ of the matrix receiving their full movement, the excess strain upon the connections will be transmitted to the spring $j^{18}$, whereupon the initial tension of the latter may be overcome and injury to the connections be avoided.

The rock shafts $j^{10}$, previously referred to, are mounted in split bearings $j^{20}$, indicated in Fig. 4, which bearings are inserted in openings $j^{21}$ in the bed of the press. The two parts constituting the split bearing are held in the adjusted position by means of set screws $j^{22}$, which latter are threaded into the bed of the press and pass into the openings in which the bearings $j^{20}$ are placed.

The movable side members $E^1$ of the matrix are held normally in retracted position in engagement with the vertical walls of the channel $c$ in the bed of the press. To achieve this result we insert sliding bolts $e^{10}$ in bores in the bed of the press, and thread the ends of such bolts into the side members of the matrix, in the manner shown in Fig. 4. Confined between the heads of the said bolts and the bottoms of the bores into which they are passed, are expansion springs $e^{11}$, the tension of which is adjusted so as to normally hold the side members of the matrix in retracted position, and until the tension of the springs $e^{11}$ is overcome by the action of the wedge mechanism.

Longitudinal movement of the side members of the matrix is prevented by stops $e^{20}$ attached to the ends of the bed C, and acting to confine the said side pieces within the longitudinal channel formed in the bed of the press. The stops $e^{20}$ also act as guides for the ends of the matrix members in their lateral movements.

*The lubricating system.*

The eccentric links $g^1$ are pivoted to the sliding blocks $I^1$ in recessed bearings $g^{10}$, which latter constitute cups for the reception of a supply of oil, whereby the connection between said eccentric links and the sliding blocks is efficiently lubricated. The sliding blocks $I^1$ are constructed interiorly with a reservoir for a supply of oil, which latter is distributed to the pivotal points of the toggle mechanism by means of a system of ducts $h^{10}$ leading from the reservoir, and shown in Fig. 5. A vent $h^{11}$ is provided as a part of the lubricating system of the toggle mechanism. Replenishment of the supply of oil in the reservoir will be indicated as necessary when the oil ceases to trickle from the vent $h^{11}$. The oil which trickles from the vent will be collected in the recessed bearings formed in the upper face of the member $D^1$ of the movable punch frame, to which the lower toggle members are connected, and thus increase the lubrication of the latter.

*The devices for supporting the knock-out bar.*

In drawing presses as heretofore constructed, it has been the practice to form a large number of circular openings through the bed of the press, and to place within certain of such openings as lead into the matrix, a series of knock-out rods, which latter are positioned for a thrusting movement against the knock-out plate employed in drawing presses to clear the blank from the matrix after the drawing operation has been performed upon the blank, and which act as distance pieces to carry the pressure of the knock-out plate when the blank is clamped thereon. The holes in the bed of the press, through which pass the rods actuating the knock-out plate, are not always suitably positioned with relation to the outlines of the matrix, and as a result an efficient and satisfactory support for the knock-out plate cannot always be obtained in the older constructions by reason of the unequal distribution of the resistance. We have overcome this objection by providing the bed of the press underneath the matrix with a succession of vertical cross slots L, which latter have a length equal to the greatest width of the matrix. The slots referred to are adapted to be filled with a series of removable and interchangeable fillers $l$ having a length approximately equal to the distance from the under side of the matrix, to the top of the lifter plate $l^2$. These fillers constructed as units and of uniform width, will be in such number as to fill the vertical slot, when placed side by side. Certain of the fillers, as $l^3$, positioned in each of the slots, are of greater length than the other fillers, and are designed to extend from the top of the lifter plate $l^2$ to the knock-out plate $l^1$. The distribution of the fillers $l^3$, which support the knock-out plate, will be selectively determined by the configuration of the matrix, it being feasible to position the fillers $l^3$, at the approximate center of the matrix or at any other point in the line of the width thereof, as may be determined to be desirable.

The knock-out lifter plate $l^2$ is supported at the upper end of vertical guide rods $l^4$, which latter are attached at the lower ends to the upper face of the vertically sliding block $I^1$. The fillers $l$ may and the fillers $l^3$ do follow the movement of the lifter plate $l^2$, as the latter is lowered by the drawing stroke of the movable punch frame, following the clamping operation. During the drawing operation, the fillers $l^3$, of superior length, act as distance pieces between the knock-out plate $l^1$ and the lifter plate $l^2$, to preserve the clamping relation between the punch and the knock-out plate. As the punch E advances with the blank $e$ into the matrix of the press, the knock-out plate $l^1$ and the fillers $l^3$ recede during such advance. The punch having completed its drawing stroke, is withdrawn, followed by an upward movement of the knock-out plate $l^1$, which latter ejects the shaped article from the matrix. The knock-out plate comes to a position of rest, flush with the face of the work table formed by the top of the bed C, and within the matrix.

*The stripping mechanism.*

As a rule, the shaped article formed by the punch in the matrix $E^1$, adheres by frictional engagement with the punch during the withdrawal of the latter, due to the separation of the matrix members following their inward movement. To facilitate freeing the drawn article from its engagement with the punch at such times, we provide a stripping mechanism, the purpose of which is to disengage the drawn article from the punch, so as to permit the withdrawal of such article from the press. The mechanism which we employ for the purpose described, comprises a crown piece M, carried at the upper end of vertically disposed rods $m$, which are guided by perforations in lugs $m^1$ formed on the bed of the press. At points below the bed of the press, where the rods $m$ pass through the lugs $m^1$, the said rods are connected by links $m^2$ to arms $m^3$ of alined rocks shafts $m^4$, journaled in brackets $m^5$, mounted upon the lower cross-heads $D^1$ near the base of the press. The shafts $m^4$ carry other arms $m^6$ upon their contiguous ends, which arms carry a pin $m^7$ mounted eccentrically with respect to the axes of the shafts $m^4$. Upon the said pin $m^7$ is journaled an antifriction roller $m^8$, which works in a cam slot $m^9$ formed in a bracket $m^{10}$, attached to the base of the press.

Depending from the crown piece M, which surmounts the press, is a series of rods $m^{11}$, guided in vertical openings in the cross-head D in the movable punch frame. Clamped upon the lower end of each of the rods $m^{11}$ is a stripper arm $m^{12}$, each of which carries a stripper finger $m^{13}$. The stripper fingers $m^{13}$ are adjustable with relation to the punch E, so that the tips of such fingers may be positioned so as to engage the article drawn from the blank, to free such article from the punch as the latter is retracted from the matrix at the completion of the drawing operation. A notched bolt $m^{14}$, as shown in Figs. 9 and 10, illustrates the means employed for holding the stripper finger in the position to which it has been adjusted.

The cam slot $m^9$ in the stationary cam bracket $m^{10}$, is so arranged that during the movements of the anti-friction roller $m^8$, in the inclined portion thereof, the stripper fingers will be maintained in what is a relatively stationary position. When the stripper fingers are in their normal position of elevation, the anti-friction roller is seated in the offset portion at the upper end of the cam slot. Movement of the punch frame X, to bring the punch into action, will pass the anti-friction roller out of the offset portion of the slot into the inclined part thereof. This movement will impart a quick downward thrust to the stripper fingers, which movement of the said fingers is merely an idle one. The continued downward movement of the anti-friction roller in the inclined portion of the cam slot $m^9$, will rotate the rock shaft $m^4$ through the short arms $m^6$, and consequently the arms $m^3$, through their longer radius, will serve to maintain the stripper fingers in the relatively stationary position, before described, during the movement of the punch E, to perform the drawing operation. The stripper fingers do not therefore make a close approach to matrix on the bed of the press. This relatively stationary position of the stripper fingers is not changed until after the punch has been withdrawn from the matrix, and the shaped article stripped therefrom. It will be understood that the action of the cams $m^{10}$ is one which interposes the stripper fingers in the path of the upward movement of the shaped article adhering to the punch when the latter is withdrawn from the matrix, and that the further movement of the said shaped article will be arrested. As the anti-friction roller $m^8$ passes into the offset portion at the upper end of the cam slot, a partial reverse rotation is imparted to the rock shafts $m^4$, and the stripper fingers then move into their initial raised position, this movement being accelerated by the formation of the cam groove. At this time, the punch and the stripper fingers are in their normal elevated positions, and a clear space over the face of the bed C, is provided for convenient removal of the article which has been drawn into shape, and for the insertion of another blank into the press.

*Modification of the means for supporting the knock-out rods.*

In Fig. 12 we have shown a modification of the means for supporting the knock-out rods in selective positions. In this view, the side walls of the slots in bed C are provided with opposing notches $l^{10}$, which receive and support the knock-out rods $l^{11}$ in position with relation to the knock out bar and the lines of the matrix. It will be observed that the opposite notches are so arranged that the knock-out rods, when selectively positioned, will be effectively supported and guided in their vertical positions to sustain the knock out-plate throughout the clamping and drawing operations.

Modifications of the invention may be made without departing from the spirit thereof.

Having thus described our invention, what we claim and desire to secure by Letters Patent of the United States is:

1. In a drawing press, a reciprocating punch, a relatively stationary matrix with which the punch coöperates, a continuously rotating shaft for actuating the punch through one portion of its movement, and an intermittingly rotating shaft for actuating the punch through the other portion of its movement.

2. In a drawing press, a reciprocating punch, a continuously rotating shaft with connections therefrom to the punch to actuate the latter through a portion of its movement, and an intermittingly rotating shaft to actuate the punch through another portion of its movement.

3. In a drawing press, a reciprocating punch, a shaft for actuating the punch through a portion of its movement, means for imparting a movement of constant rotation to the said shaft, a second shaft for actuating the punch through another portion of its movement, means for imparting an intermitting movement of complete rotation to the said second shaft during each rotation of the first shaft.

4. In a drawing press, a punch, constantly moving means operating in a time-cycle to bring the punch into clamping relation with the blank to be drawn, intermittingly operating means to actuate the punch to perform the drawing operation upon the blank, said last mentioned means operating during a fraction of the time-cycle of operation of the constantly moving means.

5. In a drawing press, a punch, a constantly driven eccentric shaft and devices operated thereby to move the punch into clamping relation with the plate to be drawn, and an intermittingly driven eccentric shaft operating through the said devices to move the punch to perform the drawing operation.

6. In a drawing press, a punch, a rotating eccentric shaft, a toggle mechanism actuated by the eccentric shaft to move the punch into clamping position with relation to the plate to be drawn, and a second eccentric shaft operating through the toggle mechanism to move the punch to perform the drawing operation.

7. In a drawing press, a main shaft, two eccentric shafts driven from the main shaft, a punch for drawing a blank into shape, one of said eccentric shafts operating to move the punch to clamping position with relation to the blank through the medium of intermediate movable devices, and said movable devices, the other eccentric shaft operating through the said devices, when positioned by the first eccentric shaft, to perform the drawing operation upon the blank.

8. In a drawing press, a driven shaft rotating in a time-cycle, a punch for drawing a blank into shape, connections between the said shaft and punch to move the latter into clamping relation with the blank, a second shaft rotating in a fraction of the time-cycle of the first shaft, and connections between the said second shaft and the punch to further move the punch to perform the drawing operation upon the blank.

9. In a drawing press, a punch having a continuous movement from its initial position to perform the drawing operation, a relatively stationary matrix with which the punch coöperates, a continuously rotating shaft and connections therefrom for actuating the punch through the first portion of its movement, an intermittingly rotating shaft and connections therefrom for actuating the punch through the second portion of its movement, and connections between the said shafts for operating them in the order described.

10. In a drawing press, a punch having a movement to clamp the plate to be drawn, continuously operating means for moving the punch to clamping position, other means, operating intermittingly, for moving the punch to perform the drawing operation upon the blank, driving connections for each of said means, and a clutch mechanism interposed in the said intermittingly operated means, whereby the intermitting operation is effected.

11. In a drawing press, a driving shaft, a punch, an eccentric shaft actuated from the driving shaft, mechanism operated by the said eccentric shaft to move the punch into clamping relation with the blank to be drawn, a second eccentric shaft actuated from the driving shaft and connections from said second eccentric shaft to continue the movement of the punch to perform the drawing operation upon the blank, and a clutch mechanism interposed between the driving shaft and the second eccentric shaft, whereby the latter is operated intermittingly.

12. In a drawing press, a punch for drawing a blank into a shaped article and a matrix coöperating with the punch, a constantly rotating eccentric shaft, and driving means therefor to move the punch into clamping relation with the plate upon the matrix, said eccentric shaft having a time-cycle of rotation, in combination with a second eccentric shaft rotating intermittingly and driving means therefor, including a clutch mechanism for imparting a complete rotation to the second eccentric shaft during a fraction of the said time-cycle, to actuate the punch to perform the drawing operation.

13. In a drawing press, a base, a bed supported therefrom, a movable punch frame the straining rods of which are guided in bearings in the bed, plungers depending from the movable punch frame and guided in fluid-pressure cylinders formed in the base, whereby the movable punch frame is counterbalanced in its vertical movements.

14. In a drawing press, a punch, a bed having a longitudinal channel in the top thereof, movable matrix members in the said channel, a wedging mechanism to impart movement of the said matrix members toward the punch when the latter enters the matrix, and means for actuating the wedging mechanism.

15. In a drawing press, a punch, a bed having a longitudinal channel in the top thereof, movable matrix members in the said channel, a wedging mechanism to impart movement of said matrix members toward the punch when the latter enters the matrix, and means for actuating the wedging mechanism, said means comprising an extensible connection set at an initial tension and which is adapted to yield when undue resistance is encountered.

16. In a drawing press, a punch, a bed provided with a longitudinal channel in the top thereof, movable matrix members arranged in the said channel, yielding means for normally holding the matrix members in retracted position, and mechanism for moving the said matrix members toward the punch when the latter enters the matrix.

17. In a drawing press, a punch, a bed provided with a longitudinal channel in the top thereof, movable matrix members arranged in the said channel, yielding means for normally holding the matrix members in retracted position, and mechanism for moving the said matrix members toward the punch when the latter enters the matrix, said mechanism embracing wedging devices, and crank connections to the latter.

18. In a drawing press, a bed provided with a series of transverse vertical slots, matrix members carried by the bed and arranged over the slots, a knock-out plate in the matrix between the side members thereof, a lifter plate, and knock-out rods selectively disposed in the slots in position to move the knock-out plate to discharge the matrix.

19. In a drawing press, a bed provided with a series of transverse vertical slots, matrix members carried by the bed and arranged over the slots, a knock-out plate, a lifter plate, a plurality of filler pieces disposed in the slots, some of which filler pieces are of superior length and transmit motion from the lifter plate to the knock-out plate, when the lifter plate is actuated to discharge the matrix.

20. In a drawing press having a matrix, a bed provided with a series of vertical slots crossing the axial line of the matrix, a knock-out plate, a group of fillers in each slot, selectively arranged fillers of each group acting as knock-out rods to move the knock-out plate to discharge the matrix.

21. In a drawing press having a matrix and a bed provided with a series of vertical cross slots underlying the matrix, a knock-out plate in the matrix, a lifter plate, knock-out rods for transmitting motion from the lifter plate to the knock-out plate to discharge the matrix, and means for selectively positioning the said rods in the slots in operative relation to the knock-out plate.

22. In a drawing press having a matrix and a bed provided with a series of vertical slots which underlie the matrix and cross the axial line thereof, knock-out rods selectively disposed in the slots with relation to the axial line of the matrix, and a knock-out plate supported by the selectively disposed rods in the series of slots to discharge the matrix.

23. In a drawing press, a bed provided with a series of vertical slots which underlie and cross the axial line of the matrix, a knock-out plate, knock-out rods selectively disposed in the slots with relation to the axial line of the matrix, and means for supporting the knock-out rods in selected position in the slots.

24. In a drawing press, a reciprocating punch, a matrix therefor, and means for actuating the punch, in combination with a stripping mechanism for the punch, and actuating means for said stripping mechanism to bring the latter to a fixed position to strip the shaped article from the punch as the latter is being withdrawn.

25. In a drawing press, a reciprocating punch, a matrix therefor, and means for actuating the punch, in combination with a stripping mechanism, means for moving the stripping mechanism into position to strip the punch and for holding said mechanism in a stationary position while the punch is being retracted.

26. In a drawing press, a reciprocating punch, a matrix therefor, and means for actuating the punch, in combination with stripping devices for the punch, means for holding the said devices in a stationary position while the moving punch is being stripped and for withdrawing the stripping devices from such stationary position.

27. In a drawing press, a punch, and moving means therefor, in combination with stripping devices acting during the withdrawal movement of the punch to strip therefrom the article drawn thereby, and means for advancing the stripping devices to a stationary point at which the stripping is effected and then retracting the said devices to their initial position.

28. In a drawing press, a reciprocating punch, a matrix, means for moving the punch into position to clamp a plate upon the matrix, stripping devices and means for moving said devices to a stationary position and maintaining such position during the retraction of the punch from its clamping position.

29. In a drawing press, a punch and stripping devices therefor, means for moving the punch and stripping devices in parallel planes, and means for maintaining the stripping devices in a stationary position while a movement of retraction is imparted to the punch.

30. In a drawing press, a punch, a matrix, means to move the punch into position to clamp a blank upon the matrix, said means operating in a predetermined time-cycle, separate means to move the punch to perform the drawing operation, such separate means operating in a fraction of the time-cycle of the first named means, and a clutch mechanism acting to interpose the operation of the said separate means within the time-cycle of operation of the said first means.

31. In a drawing press, a punch, devices which operate constantly in a predetermined time-cycle to move the punch to clamping position, other devices operating intermittingly within the said time-cycle to move the punch to perform the drawing operation, and a clutch mechanism acting to interpose the action of the intermittingly operating devices within the time-cycle of the constantly operating devices.

32. In a drawing press, a movable work shaping member, a rotary member and connections therefrom to transmit motion to the work shaping member, a second rotary member and connections therefrom to transmit further motion to the work shaping member, and means for intermitting the motion of the second rotary member during the operation of the first rotary member.

33. In a drawing press, a bed therefor having a matrix, a movable punch frame, the straining rods of which are guided in bearings formed in the bed, an eccentric shaft journaled at the under side of the bed, and connections between the eccentric shaft and the punch frame, whereby the thrust of the eccentric shaft and the pressure of the punch in opposition to each other are transmitted directly through the bed.

34. In a drawing press, a bed having a matrix, a shaft carrying the drawing eccentrics supported in fixed relation to the bed, a cross-head carrying a punch, an intermediate cross-head, link connections between the said eccentrics and the intermediate cross-head, and other connections comprising links between the intermediate cross-head and the cross-head carrying the punch.

35. In a drawing press, a bed therefor having a matrix, a movable punch frame, the straining rods of which are guided in bearings formed in the bed, an eccentric shaft supported by the said bed at the under side thereof, link connections from the said shaft to actuate the movable punch frame to perform the drawing operation, whereby the thrust of the eccentrics on the shaft and the pressure of the punch in opposition to each other are transmitted through the bed, and other link connections for moving the punch to initial clamping position preparatory to the drawing operation.

36. In a drawing press, a bed therefor having a matrix; a punch coöperating with the matrix, such punch having two movements; means, when positioned, for imparting the initial movement to the punch; an eccentric shaft supported at the under side of the bed, and means operated therefrom for imparting the second movement to the punch through the first means, whereby the thrust from the eccentric shaft and the pressure of the punch in opposition to each other are transmitted directly through the bed.

37. In a drawing press, a work shaping member, constantly moving means operating in a time-cycle to actuate the work shaping member through a portion of its movement, and intermittingly moving means to actuate the work shaping member through the other portion of its movement, the said intermitting means operating during a fraction of the time-cycle of operation of the constantly moving means.

38. In a drawing press, a punch and means for actuating the same to shape a blank, in combination with stripping devices standing normally in a retracted position, and means for advancing the said stripping devices in the direction of movement of the punch to intercept the shaped article during the return movement of the punch and strip the latter.

39. In a drawing press, a base provided with fluid-pressure cylinders formed therein, a bed for the press supported above the base, a moving punch actuating frame comprising an upper cross head and a lower cross head and straining rods uniting the said cross heads, and guided near their upper ends in bearings formed in the bed, and plungers depending from the lower cross head and working in the fluid-pressure cylinders, whereby the punch actuating frame is counter-balanced and guided for vertical movements.

In testimony whereof we have signed our names at Milwaukee this 31st day of January, 1920.

R. STANLEY SMITH.
B. T. ANDREN.
HENRY MILLER.

Witnesses:
W. F. WOOLARD,
LEVERETT C. WHEELER.